United States Patent
Pelley, III et al.

(10) Patent No.: US 8,402,327 B2
(45) Date of Patent: Mar. 19, 2013

(54) MEMORY SYSTEM WITH ERROR CORRECTION AND METHOD OF OPERATION

(75) Inventors: Perry H. Pelley, III, Austin, TX (US); George P. Hoekstra, Austin, TX (US); Peter J. Wilson, Leander, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 1013 days.

(21) Appl. No.: 12/260,727

(22) Filed: Oct. 29, 2008

(65) Prior Publication Data

US 2010/0107037 A1    Apr. 29, 2010

(51) Int. Cl.
*G06F 11/00* (2006.01)

(52) U.S. Cl. .................. 714/723; 714/6.32; 714/764

(58) Field of Classification Search .................. None
See application file for complete search history.

(56) References Cited

U.S. PATENT DOCUMENTS

| | | | | |
|---|---|---|---|---|
| 3,633,175 A * | 1/1972 | Harper | ............... | 711/108 |
| 4,939,694 A | 7/1990 | Eaton et al. | | |
| 6,434,033 B1 * | 8/2002 | Chien | ............... | 365/49.1 |
| 6,467,048 B1 * | 10/2002 | Olarig et al. | ............... | 714/6.32 |
| 7,120,836 B1 * | 10/2006 | Englin et al. | ............... | 714/53 |
| 7,222,271 B2 | 5/2007 | Ruckerbauer et al. | | |
| 2002/0152442 A1 | 10/2002 | Shau | | |
| 2003/0007408 A1 * | 1/2003 | Lien et al. | ............... | 365/222 |
| 2005/0289407 A1 * | 12/2005 | Noda et al. | ............... | 714/710 |
| 2007/0136640 A1 | 6/2007 | Jarrar | | |
| 2009/0193290 A1 * | 7/2009 | Arimilli et al. | ............... | 714/7 |

OTHER PUBLICATIONS

Jayabalan, J., et al., "Integration of SRAM Redundancy into Production Test", IEEE, ITC International Test Conference, 2002, Paper 7.4, pp. 187-193.

Schober, V., et al., "Memory Built-In Self-Repair using redundant words", IEEE, ITC International Test Conference, 2001, Paper 35.3, pp. 995-1001.

* cited by examiner

*Primary Examiner* — Gabriel Chu
(74) *Attorney, Agent, or Firm* — James L. Clingan, Jr.; Daniel D. Hill

(57) ABSTRACT

A method is provided for error correction of a memory. The method includes: providing a first memory and a second memory; initiating a read operation of the first memory to retrieve data; performing an error correction code (ECC) processing on the data, wherein the ECC processing for determining that at least a portion of the data is erroneous and for providing corrected data; and determining if an address of the erroneous data is stored in the second memory, if the address of the erroneous data is stored in the second memory, storing the corrected data in the second memory, and if the address of the erroneous data is not stored in the second memory, storing the address in the second memory.

20 Claims, 3 Drawing Sheets

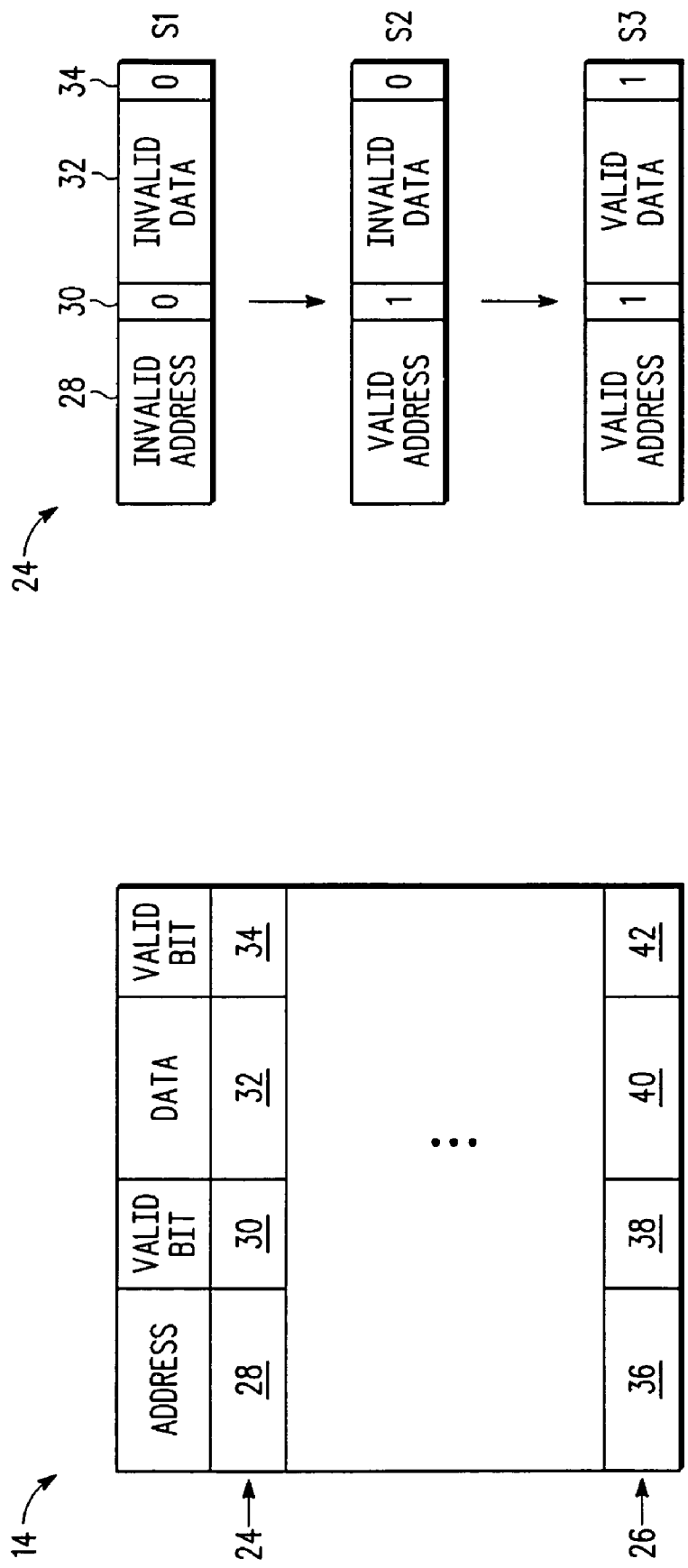

1

MEMORY SYSTEM WITH ERROR CORRECTION AND METHOD OF OPERATION

BACKGROUND

1. Field

This disclosure relates generally to memory systems, and more specifically, to memory systems having error correction and methods of operating those systems.

2. Related Art

Error correction code (ECC) is commonly used to correct single bit errors that commonly occur as soft errors that are caused randomly; often by alpha particles as well as other high energy particles. The ECC is thus generally designed to correct single bit failures. The layout of the memory is often interleaved so as to further reduce the likelihood of double bit failures due to a soft error event. Therefore, errors caused in this way very rarely have more than one error per word. A much more complex and costly ECC is required to correct two bit errors. A word that has two bits with errors thus is nearly always uncorrectable. Uncorrectable errors create a significant problem in system operation so should be very infrequent and preferably never occur.

The situation where two bit errors have a significantly increased likelihood is where a single bit error in a particular word is recurring. If a word has a bit that has failed on a continuous basis, then when a random error occurs in that word, there are two bits in the word that need correcting which is not likely to be possible. When such an event occurs, there is a significant cost to system operation.

One ECC technique addresses this issue by writing back the data to the memory location whenever an error has been detected then reading the memory location again to see if the error is repeated. If it is repeated, then the error is corrected by redundancy, i.e, the data from that memory location is stored elsewhere in spare memory. This can be effective to some extent, but some bit errors that occur do not occur immediately, but have a delayed failure. Thus, the bit may fail some time after having been written so it passes the test, but it soon fails thereafter. This can be particularly true in a high temperature environment where leakage causes a failure. The high temperature raises the leakage so a failure soon occurs but not soon enough to be found by the test after re-writing the data. Also, this re-writing of the data and subsequent testing is likely to be disruptive to system operation.

Accordingly there is a need for a memory system that overcomes or improves upon the problems described above.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 2 is block diagram of a portion of the system of FIG. 1 in more detail.

FIG. 3 is a diagram of an entry in the portion of FIG. 1 shown in three sequential states of processing.

DETAILED DESCRIPTION

A system includes a content addressable memory (CAM) and a main memory in which the CAM is used as a redundant memory for use in replacing locations in main memory that have been found to be defective. A memory location is considered defective if it has been found to be defective some number of times more than one. A total of two failures of a given location may be sufficient to consider the location defective. Once found defective, the memory location is replaced with an entry in the CAM so that reading from the memory location is replaced by reading from the CAM entry. When the first error is found, the address of the memory location is entered in the CAM. When the second error at that address is found, the corrected data is entered in the CAM at that address and, future accesses to that address use the memory location associated with the address in the CAM. This is a non-disruptive technique for reliably implementing replacement of bad memory locations. This is better understood by reference to the drawings and the following description.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Figure 1:
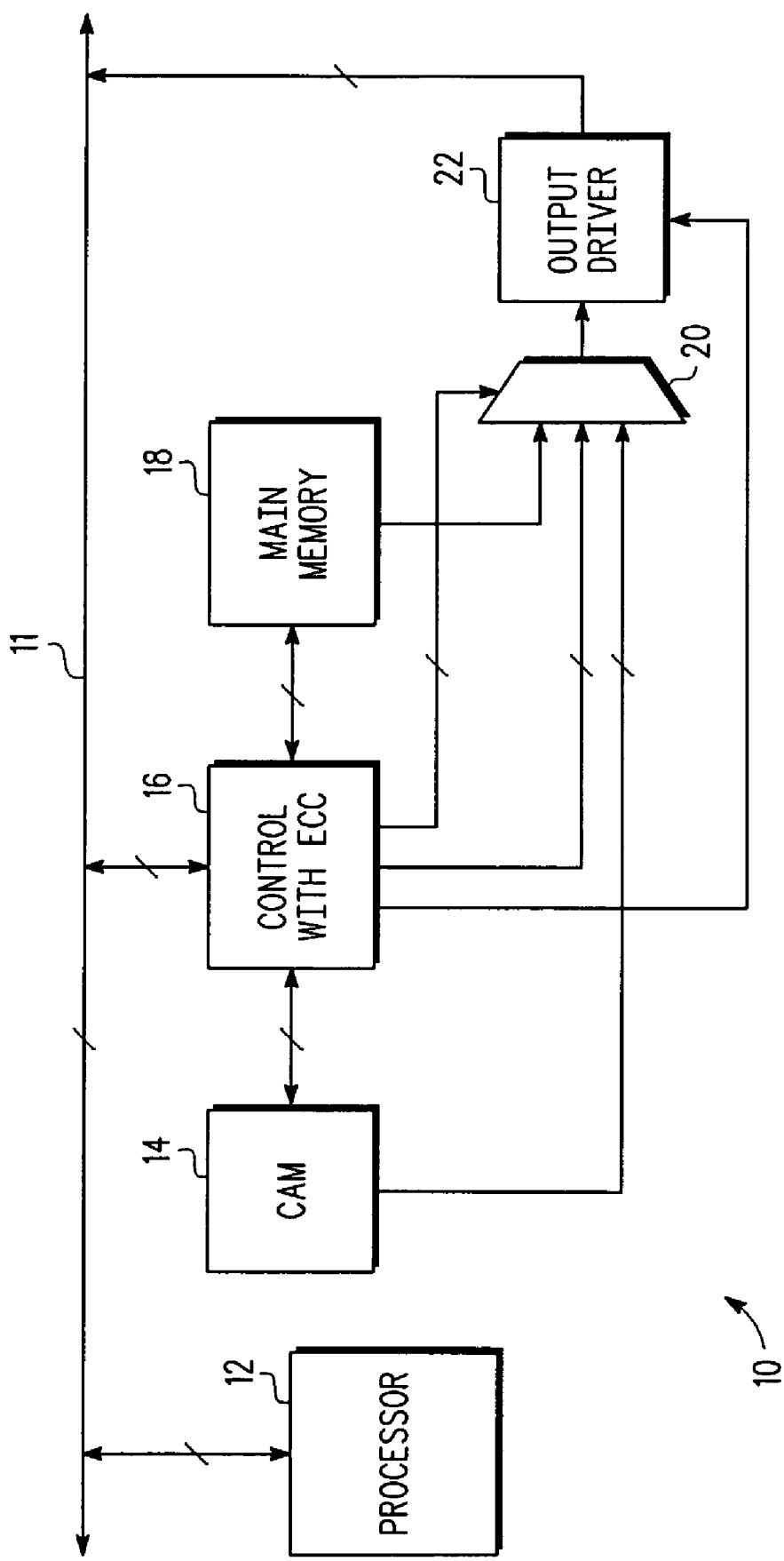
FIG. 1 is a block diagram of a system according to an embodiment of the invention.

Shown in FIG. 1 is a system 10 comprising a system interconnect 11, a processor 12 coupled to system interconnect 11, a content addressable memory (CAM) 14, a control circuit 16 coupled to system interconnect 11 and CAM 14, a main memory 18 coupled to control circuit 16, a multiplexer 20 coupled to CAM 14, control circuit 16, and main memory 18, and an output driver 22 coupled to multiplexer 20 and control logic 16. Main memory 18 is preferably organized in rows and columns. Control circuit 16 includes circuitry for running error correction code (ECC). Control circuit 16 controls operation of CAM 14, main memory 18, multiplexer 20, and output driver 22 in response to instructions provided by processor 12 through system interconnect 11. In performing a read at an address in which there is a location in main memory 18 that corresponds to the address, generally the data is provided from main memory at the address location. Error correction is performed as needed. Also, the first time error correction is performed on data at a particular address, the address is loaded into CAM 14. The second time error correction is performed at the address, the corrected data is loaded into CAM 14 at a location corresponding to the address that had been loaded when the first error correction occurred. After that, the location in CAM 14 replaces the location in main memory for reading and writing. Data is presented to multiplexer 20 from main memory 18 in the most common case, from control circuit 16 when error correction is performed, and from CAM 14 when the data to be provided is from a location in CAM that has replaced a location in main memory 18. Output driver 22 receives the data presented to multiplexer 20 as selected by control logic 16. Output driver 22 outputs the received data to system interconnect 11. Data may be retrieved from main memory 18 in rows but a data location for correcting and storing in CAM 14 can be less than a whole row of main memory 18 to avoid making CAM 14 unnecessarily large.

Shown in FIG. 2 is CAM 14 showing a plurality of entries including two exemplary entries; entry 24 and entry 26. Each entry of the plurality of entries has four locations. One is for storing an address, one is for storing a valid bit for indicating the address is valid, one is for storing data, and one is for storing a valid bit indicating the data is valid. For entry 24, there is address location 28, a valid bit location 30 for the address stored in address location 28, a data location 32, and a valid bit location 34 for the data stored in data location 32. For entry 26, there is address location 36, a valid bit location 38 for the address stored in address location 36, a data location 40, and a valid bit location 42 for the data stored in data location 40.

Shown in FIG. 3 is a sequence of states, S1, S2, and S3, for entry 24 for the case where entry 24 replaces a location in main memory 18. Entry 24 begins at state S1 with an invalid address, invalid data, and valid bit 30 set to indicate that the address stored in address location 28 is invalid. State S2 occurs when entry 24 stores an address of a location in main memory where data from that location underwent error correction. In State S2, a valid address is stored in address location 28, the valid bit 30 is set to indicate that the address stored in address location 38 is valid, the data in data location 32 is still invalid, and valid bit 34 indicates the data in data location 32 is invalid. State 3 occurs when entry 24 has a valid address and valid data, and entry 24 replaces a location in main memory 18. In state S3, a valid address is stored in address location 28, the valid bit 30 is set to indicate that the address stored in address location 38 is valid, the data in data location 32 is valid, and valid bit 34 indicates the data in data location 32 is valid.

Figure 4:
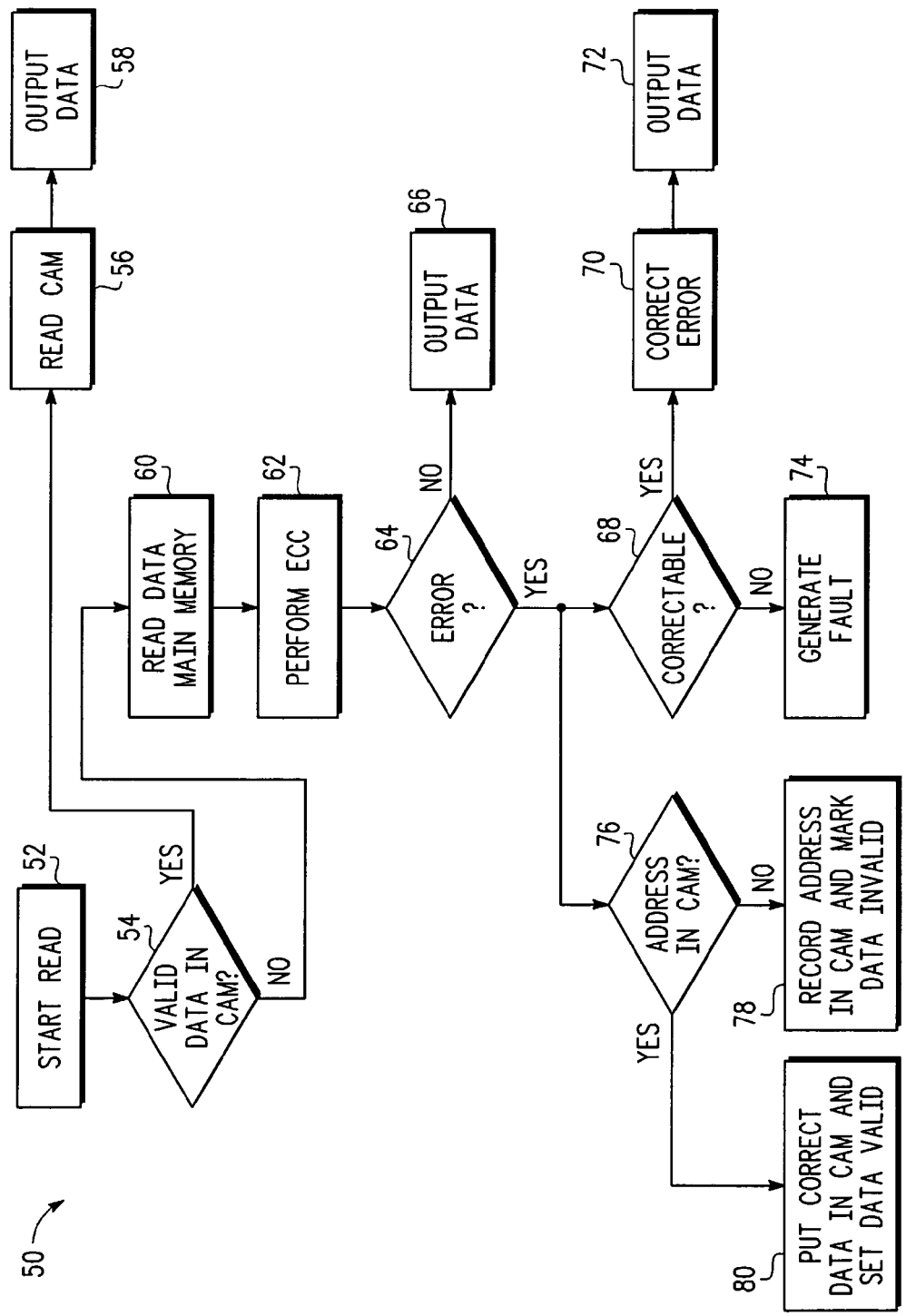
FIG. 4 is a flow chart of a method of operation of the system of FIG. 1.

Shown in FIG. 4 is a flow chart 50 having steps useful in understanding the operation of system 10 for a read operation responding to a current address provided by processor 12 on system interconnect 11 starting at step 52. At step 54, a determination is made by control circuit 16 as to whether there is valid data in CAM 14 at the current address. If there is, that means the current address is stored in an entry in CAM 14 and valid data is present in the corresponding entry, which is at state 3 as shown for entry 24 in FIG. 3. This information may be obtained by reading the valid bits for the entry. First, there is a determination if the current address is present in the address location of any of the entries of CAM 14. If so and if the valid bit for the data location is set to valid, the data at the current address is read from CAM 14, and the data is output at step 58 through multiplexer 20 and output driver 22 to bus interconnect 11. Control circuit 16 applies the current address to CAM 14 and selects the output of CAM 14 to pass through multiplexer 20 to output driver 22.

If at step 54 the determination is "no" by control logic 16, data is read from main memory as shown in step 60 in response to the current address provided by control logic 16. The determination of "no" arises anytime the data is invalid at the current address in CAM 14. If the current address is not present in CAM 14, that will also result in the decision of no. After reading main memory 18 to obtain the data at the location in main memory 18 of the current address, the ECC of control circuit 16 is applied to the data at step 62. If there is no error as determined at step 64 the data is output as shown in step 66 from main memory 18 to multiplexer 20 and from multiplexer 20 to output driver 22. The input of multiplexer 20 receiving from main memory 18 is selected by control circuit 16 for coupling to output driver 22. The data is output by output driver 22.

If at step 64 there is a determination by control circuit 16 that there is an error, there is both a step 68 that determines if the error is correctable and a step 76 that determines if the current address is in the CAM. Control logic 16 interacts with CAM 14 to determine if the current address is in the CAM. If the error is correctable, the error is corrected at step 70 according to the ECC of logic circuit 16 and is output as output data at step 72 through multiplexer 20. In the case of error correction being performed, logic circuit 16 causes multiplexer 20 to select the output from control logic 16 for coupling to output driver 22. If the error is uncorrectable, a fault is generated at step 74 by logic circuit 16 and communicated to processor 12 through system interconnect 11.

If the current address is in an entry of CAM 14 as determined at step 76, the data is placed into the data location of the entry of CAM 14 that has the current address. Logic circuit 16 provides the current address to CAM 14. CAM 14 provides information to logic circuit 16 as to whether the current address is present in one of the entries of CAM 14 and if so, if it is valid. If the current address is not a valid entry of CAM 14, the current address is loaded by control logic 16 into an address location of an entry of CAM 14 that is available and the valid bit for the data location is set to the invalid state by control logic 16. With the execution of step 78, the entry has moved from state S1 to state S2 of the states shown in FIG. 3 for entry 24. If step 76 determines that the address is in CAM 14, in step 80 control circuit 16 may load the corrected data into the data location of the entry that has the current address in the address location and set the valid bit for the data location to valid. This results in the entry of CAM 14 that is loaded with the current address and corresponding data replacing the location in main memory 18 as the location that is accessed by the current address. Control circuit 16 may utilize a counter to aid in determining if the data should be loaded. By using a counter, logic circuit 16 may wait a predetermined number of times, a number greater than one, that the ECC has determined there is an error before implementing the entry of CAM 14 having the current address as a replacement for the location in main memory 18 that corresponds to the current address. With the execution of step 80, the entry has moved from state S2 to state S3 of the states shown in FIG. 3 for entry 24.

Flow chart 50 depicts an operation of system 10 in which entries in a CAM are used as redundancy for main memory 18. The first time an error is detected at a location in main memory 18, the address is remembered in a selected entry in CAM 14. A subsequent occurrence or predetermined number of occurrences of an error at the location results in the selected entry in CAM 14 replacing the location in main memory. The number of occurrences of a detected failure in order to invoke the replacement is selectable. Due to the relatively rare occurrence of a soft error for a given location, two errors at a given location is a strong indication that it is a hardware error that will continue to be repeated. The process of leading up to and including the step of determining if a replacement should be performed is invisible to the processor. The process of providing data to processor 12 through system interconnect 11, even if it includes manipulating CAM 14 with logic circuit 16, is not adversely impacted. Of course generating a fault due to an incorrectable error adversely impacts read operations, but the approach described is beneficial in providing a reduced likelihood of double bit errors which is a leading cause of uncorrectable errors. The use of a CAM for redundancy is beneficial in providing for a large number of entries compared to the number of redundant rows and/or columns that are normally available for implementing hardware redundancy. The address portion of CAM 14 can be implemented in a non-volatile memory so that the addresses that had failures can be remembered even if power is removed. Alternatively, if address data in CAM 14 is lost on power-down, conditions, such as temperature, may be different upon power-up so that bits that failed under one set of conditions may not fail under the conditions on the next power-up. In such case the previously bad locations may become usable again.

By now it should be appreciated that there has been provided a method including providing a first memory and a second memory, initiating a read operation of the first memory to retrieve data, performing an error correction code (ECC) process on the data, and determining if an address of the erroneous data is stored in the second memory. The ECC process is for determining that at least a portion of the data is erroneous and for providing corrected data, wherein data that is determined as having a least a portion which is erroneous is erroneous data. If the address of the erroneous data is stored in the second memory, storing the corrected data in the second memory. If the address of the erroneous data is not stored in the second memory, storing the address in the second memory. The method may be further characterized by the first memory being one of either a dynamic random access memory (DRAM) or a static random access memory (SRAM). The method may be further characterized by the second memory being a content addressable memory (CAM). The method may further comprise determining if the data is stored in the second memory prior to performing the step of performing the ECC process on the data, wherein if the data is stored in the second memory, reading the data from the second memory instead of from the first memory. The method may further comprise determining if the data is stored in the second memory prior to performing the step of performing the ECC process on the data, wherein if the data is not stored in the second memory, reading the data from the first memory. The method may further comprise outputting the corrected data to a data processor. The method may be further characterized as being performed during a normal read operation of the first memory. The method may further comprise providing a counter coupled to the second memory, the counter for counting a number of times corrected data is stored in the second memory. The method may further comprise providing a data valid bit in the second memory corresponding to the corrected data, validating the data valid bit in response to the corrected data being stored in the second memory; and invalidating the data valid bit in response to the corrected data not being stored in the second memory.

There is also described method that includes providing a main memory and a content addressable memory (CAM) coupled to a processor, initiating a read operation of the main memory to retrieve data in response to a request from the processor, performing an error correction code (ECC) processing on the data, and determining if an address of the erroneous data is stored in the CAM. The ECC processing is for determining that at least a portion of the data is erroneous and for providing corrected data in response to the request, wherein data that is determined as having a least a portion which is erroneous is erroneous data. If the address of the erroneous data is stored in the CAM, storing the corrected data in the CAM and validating a data valid bit corresponding to the corrected data. If the address of the erroneous data is not stored in the CAM, storing the address in the CAM and invalidating a data valid bit corresponding to the corrected data. The method may further comprise determining if the data is stored in the CAM prior to performing the step of performing ECC processing on the data, wherein if the data is stored in the CAM, reading the data from the CAM instead of from the main memory. The method may further comprise determining if the data is stored in the CAM prior to performing the step of performing ECC processing on the data, wherein if the data is not stored in the CAM, reading the data from the main memory. The method may further comprise outputting the corrected data to a data processor. The method may be performed during a normal read operation of the main memory.

Described also is a system including means for initiating a read operation of a first memory to retrieve data. The system further includes means for performing an error correction code (ECC) process on the data, wherein the ECC process for determining that at least a portion of the data is erroneous and for providing corrected data, wherein data that is determined as having a least a portion which is erroneous is erroneous data. The system further includes means for determining if an address of the erroneous data is stored in a second memory; and if the address of the erroneous data is stored in the second memory, the corrected data is stored in the second memory and a data valid bit corresponding to the corrected data is validated, and if the address of the erroneous data is not stored in the second memory, the address is stored in the second memory and the data valid bit corresponding to the corrected data is invalidated. The system may be further characterized by the second memory being a content addressable memory (CAM). The system may further comprise a counter coupled to the CAM, the counter for storing a value corresponding to a number of times corrected data is stored in the CAM, the value for providing an indicator of impending failure of the first memory. The system may be further characterized by the first memory comprising a plurality of memory cells organized in rows and columns, wherein the corrected data comprises a plurality of bits and the plurality of bits being less than a number of memory cells comprising one row of the first memory. The system may be further characterized by the second memory including a plurality of entries, each entry of the plurality of entries comprising an address bit field for storing an address corresponding to the erroneous data, an address valid bit field storing an address valid bit, a data bit field storing the corrected data; and a data valid bit field storing the data valid bit.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention.

Also for example, in one embodiment, the illustrated elements of system 10 are circuitry located on a single integrated circuit or within a same device. Alternatively, system 10 may include any number of separate integrated circuits or separate devices interconnected with each other. For example, processor 12 may be on a different integrated circuit than the other circuit elements shown in FIG. 1. System 10 minus processor 12 may be considered a memory or memory system.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention is described herein with reference to specific embodiments, various modifications and changes can be made without departing from the scope of the present invention as set forth in the claims below. For example, the redundant memory was described as a CAM and a CAM is considered beneficial but other memory types and other schemes for implementing the redundancy may be found to be effective. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

The invention claimed is:

1. A method comprising:
providing a first memory and a second memory;
initiating a read operation of the first memory to retrieve data;
performing an error correction code (ECC) process on the data, wherein the ECC process is for determining that at least a portion of the data is erroneous and for providing corrected data, wherein data that is determined as having a least a portion which is erroneous is erroneous data; and
determining if an address of the erroneous data is stored in the second memory,
  if the address of the erroneous data is stored in the second memory, storing the corrected data in the second memory, and
  if the address of the erroneous data is not stored in the second memory, storing the address in the second memory.

2. The method of claim 1 wherein the first memory is one of either a dynamic random access memory (DRAM) or a static random access memory (SRAM).

3. The method of claim 1 wherein the second memory is a content addressable memory (CAM).

4. The method of claim 1 further comprising determining if the data is stored in the second memory prior to performing the step of performing the ECC process on the data, wherein if the data is stored in the second memory, reading the data from the second memory instead of from the first memory.

5. The method of claim 1 further comprising determining if the data is stored in the second memory prior to performing the step of performing the ECC process on the data, wherein if the data is not stored in the second memory, reading the data from the first memory.

6. The method of claim 1 further comprising outputting the corrected data to a data processor.

7. The method of claim 1 wherein the method is performed during a normal read operation of the first memory.

8. The method of claim 1 further comprising:
providing a counter coupled to the second memory, the counter for counting a number of times corrected data is stored in the second memory.

9. The method of claim 1 further comprising:
providing a data valid bit in the second memory corresponding to the corrected data;
validating the data valid bit in response to the corrected data being stored in the second memory; and
invalidating the data valid bit in response to the corrected data not being stored in the second memory.

10. A method comprising:
providing a main memory and a content addressable memory (CAM) coupled to a processor;
initiating a read operation of the main memory to retrieve data in response to a request from the processor;
performing an error correction code (ECC) processing on the data, wherein the ECC processing for determining that at least a portion of the data is erroneous and for providing corrected data in response to the request, wherein data that is determined as having a least a portion which is erroneous is erroneous data; and
determining if an address of the erroneous data is stored in the CAM,
  if the address of the erroneous data is stored in the CAM, storing the corrected data in the CAM and validating a data valid bit corresponding to the corrected data, and
  if the address of the erroneous data is not stored in the CAM, storing the address in the CAM and invalidating a data valid bit corresponding to the corrected data.

11. The method of claim 10 further comprising determining if the data is stored in the CAM prior to performing the step of performing ECC processing on the data, wherein if the data is stored in the CAM, reading the data from the CAM instead of from the main memory.

12. The method of claim 10 further comprising determining if the data is stored in the CAM prior to performing the step of performing ECC processing on the data, wherein if the data is not stored in the CAM, reading the data from the main memory.

13. The method of claim 10 further comprising outputting the corrected data to a data processor.

14. The method of claim 10 wherein the method is performed during a normal read operation of the main memory.

15. The method of claim 10 further comprising:
providing a counter coupled to the CAM, the counter for storing a value corresponding to a number of times corrected data is stored in the CAM, the value for providing an indicator of impending failure of the main memory.

16. A system comprising:
means for initiating a read operation of a first memory to retrieve data;
means for performing an error correction code (ECC) process on the data, wherein the ECC process for determining that at least a portion of the data is erroneous and for providing corrected data, wherein data that is determined as having a least a portion which is erroneous is erroneous data; and
means for determining if an address of the erroneous data is stored in a second memory,
  if the address of the erroneous data is stored in the second memory, the corrected data is stored in the second memory and a data valid bit corresponding to the corrected data is validated, and if the address of the erroneous data is not stored in the second memory, the address is stored in the second memory and the data valid bit corresponding to the corrected data is invalidated.

17. The system of claim 16 wherein the second memory is a content addressable memory (CAM).

18. The system of claim 17 further comprising a counter coupled to the CAM, the counter for storing a value corresponding to a number of times corrected data is stored in the CAM, the value for providing an indicator of impending failure of the first memory.

19. The system of claim 16 wherein the first memory comprises a plurality of memory cells organized in rows and columns, wherein the corrected data comprises a plurality of bits, the plurality of bits being less than a number of memory cells comprising one row of the first memory.

20. The system of claim 16 wherein:
the second memory includes a plurality of entries;
each entry of the plurality of entries comprises an address bit field for storing an address corresponding to the erroneous data;
an address valid bit field stores an address valid bit;
a data bit field stores the corrected data; and
a data valid bit field stores the data valid bit.

* * * * *